UNITED STATES PATENT OFFICE.

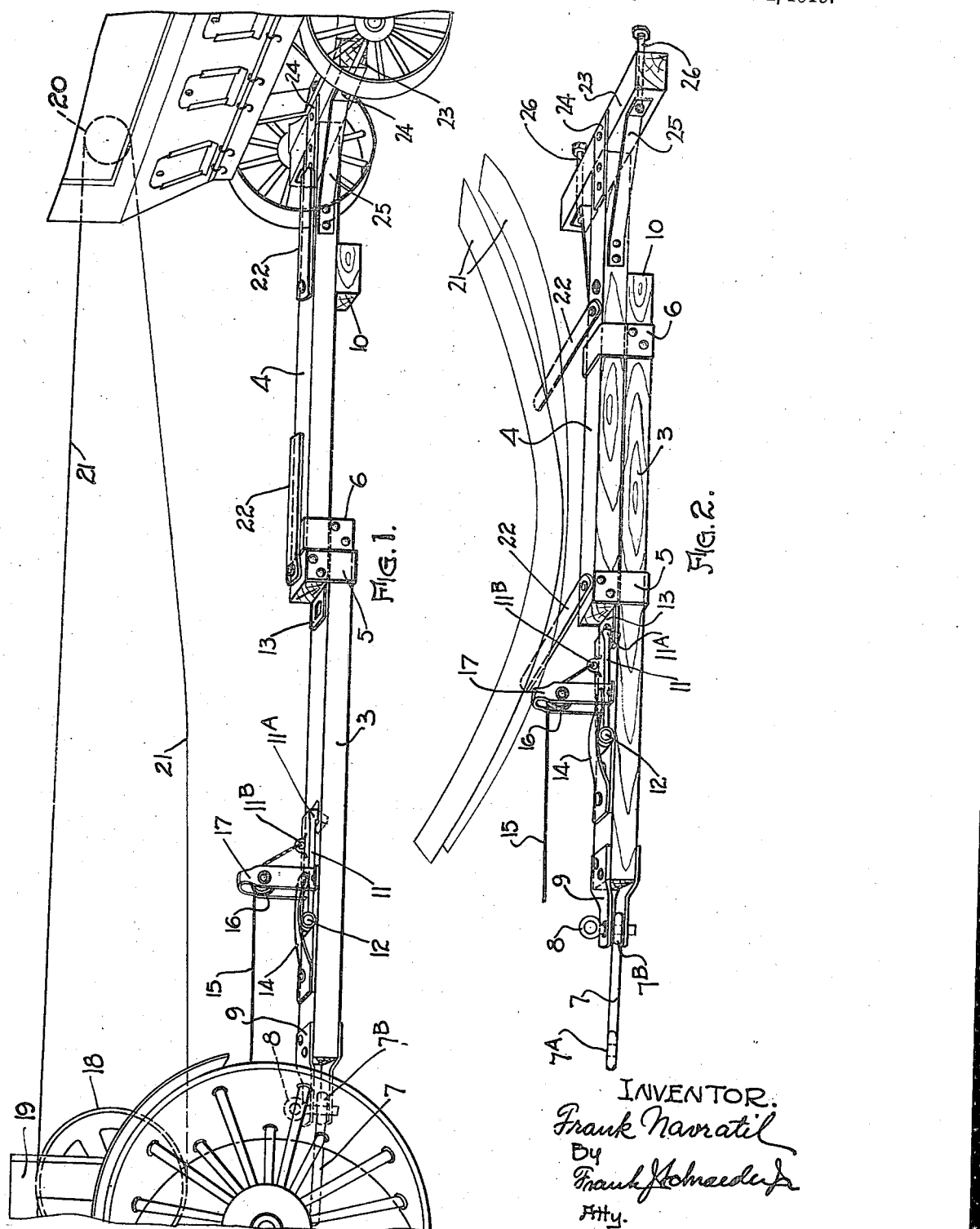

FRANK NAVRATIL, OF KEALEY SPRINGS, SASKATCHEWAN, CANADA.

CONNECTION-BAR.

1,296,105.

Specification of Letters Patent.

Patented Mar. 4, 1919.

Application filed December 7, 1916. Serial No. 135,582.

*To all whom it may concern:*

Be it known that I, FRANK NAVRATIL, a citizen of Canada, residing at Kealey Springs, in the Province of Saskatchewan, Canada, have invented certain new and useful Improvements in Connection-Bars, of which the following is a specification.

This invention relates to vehicle connection-bars and more particularly to an improved connection-bar and belt support used especially as a draw-bar between a threshing machine or separator and a farm tractor during the conveying of the separator.

An object of this invention is a telescoping connection-bar of the character described making constant connection between a power-tractor and separator both during the conveying of the separator when in telescoped position and also when stationary and in extended position during operation. The value of this constant connection between the tractor and separator will be appreciated in time of fire when the separator may be readily and quickly conveyed to a place of safety from such fire.

It is also an object to provide a combined connection-bar and drive-belt support.

With these and other objects in view my invention consists in the novel construction, combination, association, and relative position of the parts and members shown in the accompanying drawings, hereinafter described, and particularly pointed out in the appended claims.

Referring to the drawing in which like reference characters indicate like or corresponding parts:

Figure 1 illustrates my invention applied in extended position and connecting a separator (partly shown) with a power-tractor also partly shown.

Fig. 2 shows my improved connection-bar in telescoped position which position is utilized in the conveying of the separator said figure also showing belt supporting-arms.

Referring to the drawings, I provide a pair of longitudinally slidable members 3 and 4 which are maintained together by a pair of substantially U shaped straps 5 and 6. The strap 5 being rigidly attached to member 4 and embracing the lower member 3, and the inverted strap 6 rigid with the lower member 3, extending upwardly over to top member 4.

For purposes of flexibility an eye-bar 7 may be utilized for the tractor connection. Such eye-bar 7 having one eye $7^A$ suitably engaging the tractor and the other eye $7^B$ engaging the pin 8 within the plate clevis 9 which is rigidly fixed to the forward end of member 3.

A block 10, or equivalent, rigidly mounted on the underside of the top member A positively limits the telescoping action of the members.

Near the forward end of the member 3 and on the top thereof, I provide an automatic locking device whereby the two slidable members are locked in telescoped position. This locking device includes a flat cast hook 11 pivotally mounted at 12 and normally maintained by means of the leaf spring 14, in locked position, with the hooked end $11^A$ engaging within the opening of the lock-plate 13 which is rigid on the lower side of the forward end of the top member 4.

A cable or rope 15 extends from the operating cab of the tractor over the sheave 16 within the housing 17 and connects to the cast lug $11^B$ on the hook 11.

In moving the separator from place to place, the relaxed drive-belt 21 is supported on the pivoted arms 22 and the connection-bar maintains the locked telescoped position shown in Fig. 2 and after proper location of separator, the two members are unlocked by pulling upon cable or rope 15 which permits the tractor to move forward until the bar is entirely extended as shown in Fig. 2, thus properly locating or positioning the tractor 19 with the drive pulley 18 at the right distance from the separator drive-pulley 20, so that the belt 21 is properly tensioned. The belt supporting bars may then be turned parallel to the top member 4 as shown in Fig. 1.

The top member 4 is rigidly fixed to the end cross beam 23 by means of the connection plates 24 and brace bars 25. The cross beam 23 has rigid connection with the front gear of the separator or other vehicle by means of the bolts 26.

It is thought that the foregoing description and illustrations clearly disclose the invention, hence a more extended explanation is omitted.

I claim:

1. In a connection-bar extending from a separator to a conveying tractor, the combination of a pair of adjacent longitudinally slidable members, the lower of said members having pivotal connection for said tractor and the upper of said members having rigid connection with said separator; a U-shaped guide-strap attached to each member and movable therewith and constantly embracing the other member; a pair of pivotally mounted belt-supporting bars on said upper member; means for limiting the telescoping movement of said members; automatic locking means for said members; and operating means extending from the tractor arranged to unlock said locking means.

2. In a connection-bar extending from a separator to a conveying tractor, the combination of a pair of adjacent longitudinally slidable members, the lower of said members having pivotal connection with said tractor and the upper of said members having rigid connection with said separator; a pair of pivotally mounted belt-supporting bars on said upper member; means for limiting the telescoping movement of said members; a U-shaped guide-strap attached to each member and movable therewith and constantly embracing the other member; automatic locking means for said members including a resiliently retained hook pivotally mounted on the lower slidable member, a lock-plate on the forward end of the upper member arranged for engagement by said hook; operating means extending from the tractor to said hook arranged to disengage said hook from said lock-plate to permit the extension of the connection-bar.

In witness whereof, I have hereunto subscribed my name this 23 day of October, 1916.

FRANK NAVRATIL.